United States Patent [19]

Baran, Jr.

[11] Patent Number: 5,361,991

[45] Date of Patent: Nov. 8, 1994

[54] SPRAY UNIT WITH ANTI-DRIFT SHIELD

[75] Inventor: Walter Baran, Jr., Fayetteville, N.Y.

[73] Assignee: Margaret O. Baran, Fayetteville, N.Y.; Executrix of the Estate of Walter Baran, Jr.

[21] Appl. No.: 120,978

[22] Filed: Sep. 14, 1993

[51] Int. Cl.$^5$ .............................................. B05B 1/20
[52] U.S. Cl. ...................................... 239/165; 239/288
[58] Field of Search ............... 239/164, 165, 159, 288, 239/288.3, 288.5, 104

[56] References Cited

U.S. PATENT DOCUMENTS

| | | | |
|---|---|---|---|
| 751,612 | 2/1904 | Case | 239/165 |
| 1,526,642 | 2/1925 | Nissley | 239/164 |
| 3,977,605 | 8/1976 | Sheldon | 239/104 |
| 4,186,879 | 2/1980 | Kinder | 239/172 |
| 4,725,004 | 2/1988 | Baran | 239/164 |
| 4,804,145 | 2/1989 | Seymour et al. | 239/666 |

FOREIGN PATENT DOCUMENTS

| | | | |
|---|---|---|---|
| 738568 | 10/1932 | France | 239/164 |
| 745836 | 12/1933 | France | 239/164 |
| 2450057 | 10/1980 | France | 239/288 |
| 2608944 | 7/1988 | France | 239/288 |

Primary Examiner—Andres Kashnikow
Assistant Examiner—Kevin P. Weldon
Attorney, Agent, or Firm—Chilton, Alix & Van Kirk

[57] ABSTRACT

A mobile spray unit including a frame member which forms part of a motive assembly and from which is supported a horizontally disposed spray bar which carries a plurality of spray nozzles oriented to direct their spray downwardly, Positioned laterally about the downwardly directed spray of these nozzles is an anti-drift shield, This shield comprises a skirt or curtain of flexible material hanging down from a tubular frame. The frame is of generally racetrack configuration with the spray bar being located centrally thereof and with the frame being supported in a manner that permits it to be adjusted vertically with respect to the spray bar and accordingly the spray nozzles. The frame includes a central section and U-shaped end sections with the end section being telescopically mounted on the central section so that they may be laterally adjusted with respect to the central section to thereby accommodate spray bars of different length.

10 Claims, 4 Drawing Sheets

SPRAY UNIT WITH ANTI-DRIFT SHIELD

BACKGROUND OF THE INVENTION

This invention pertains generally to mobile spray units for spraying liquid chemicals and the like and has particular relation to such a unit with an improved anti-drift shield to confine the spray to a designated target area.

Figure 1:
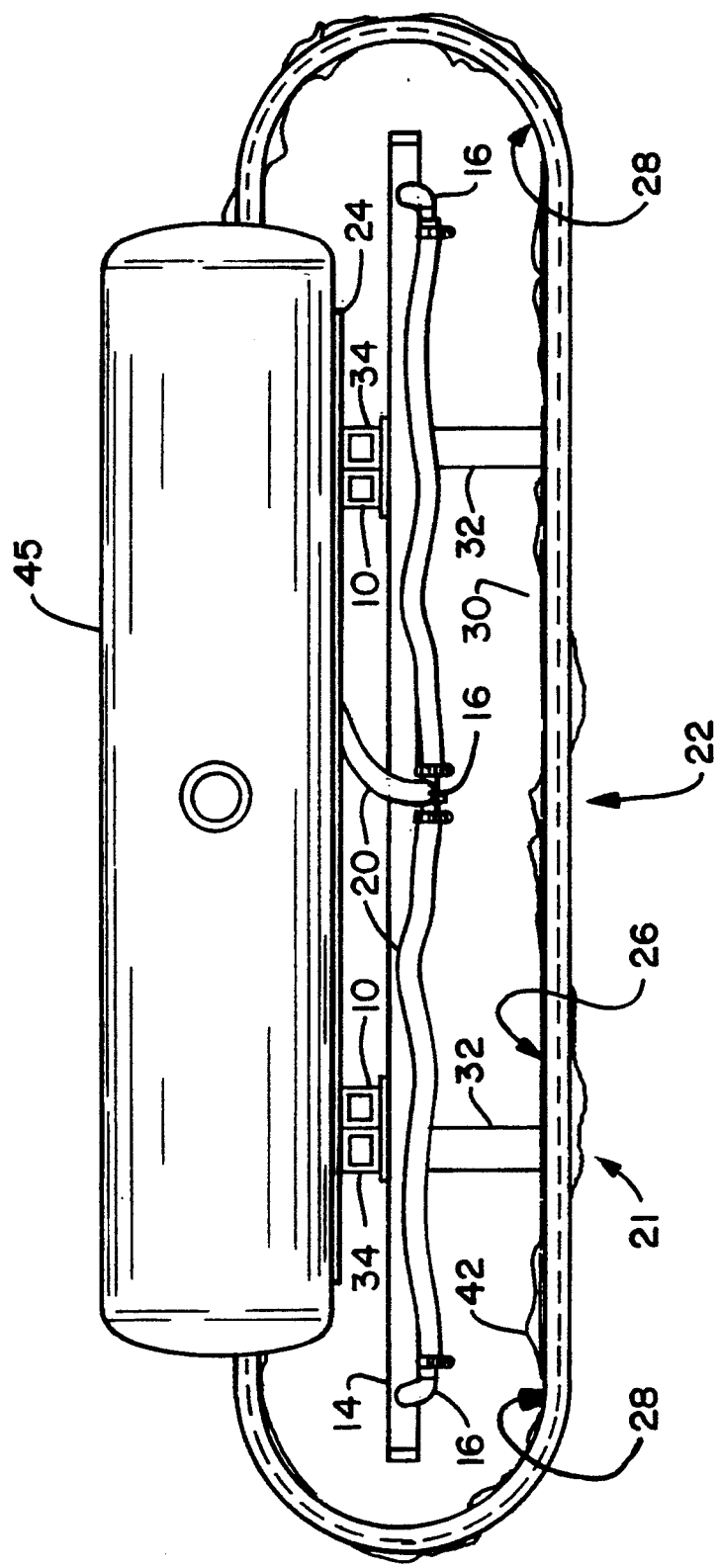
Figure 2:
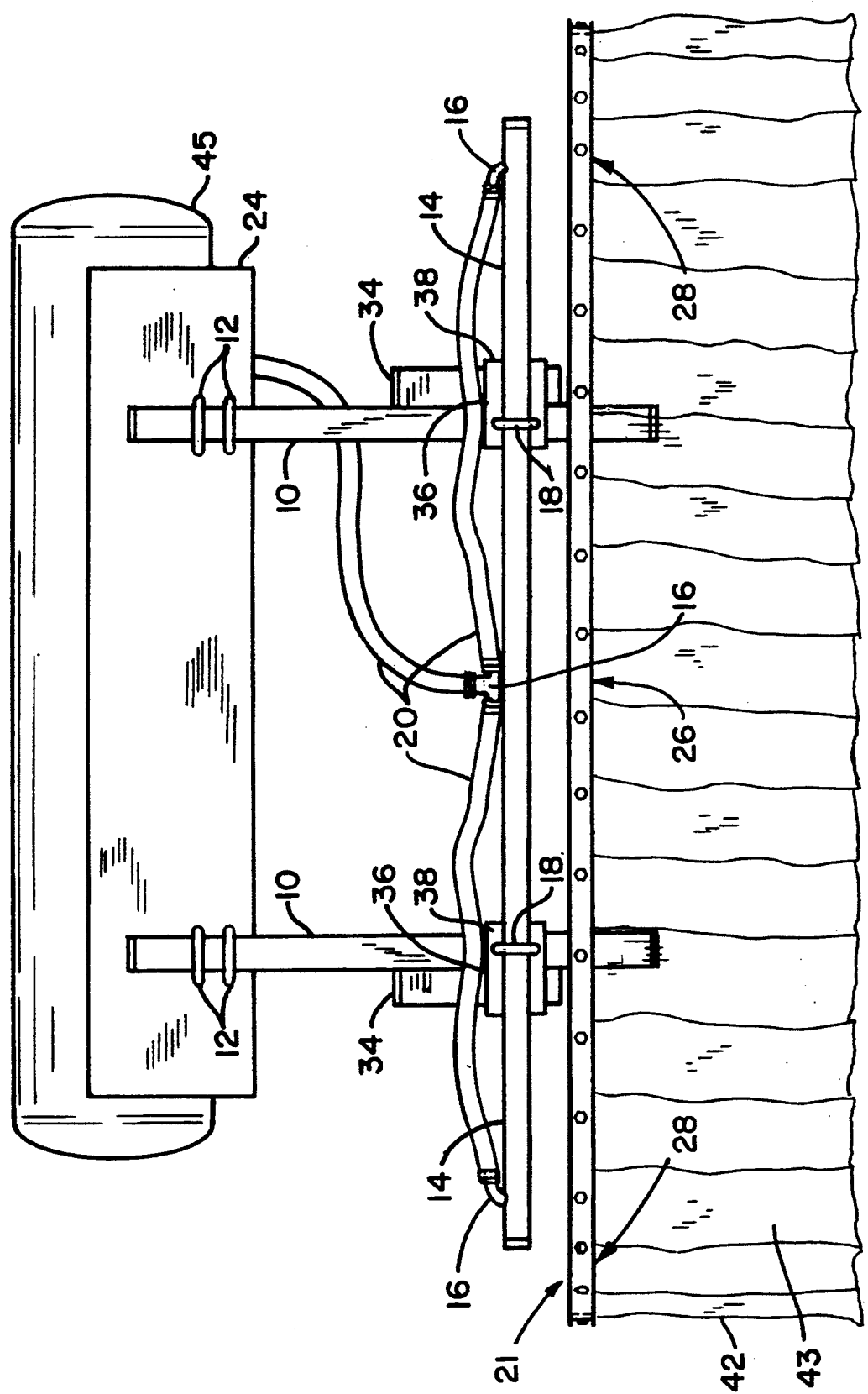
Figure 3:
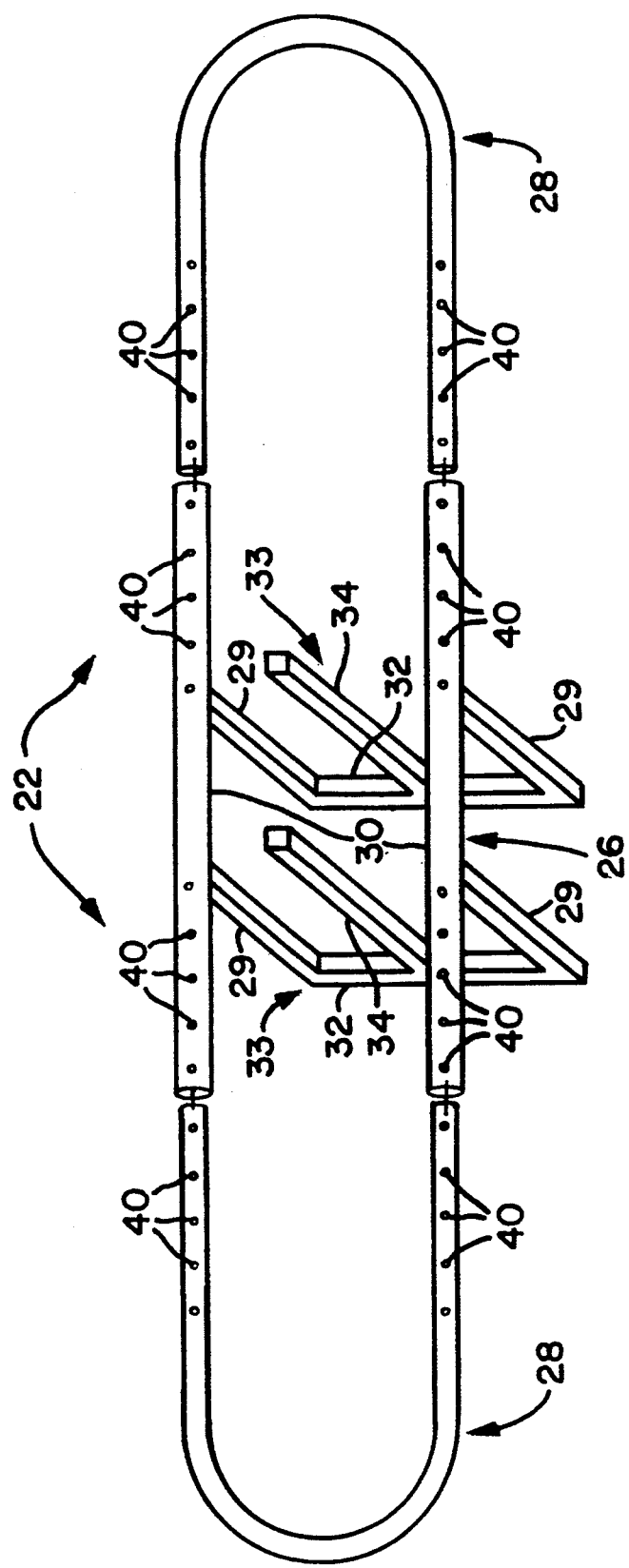

In the application of chemicals in the agriculture industry it is common that the spray apparatus be positioned behind moving equipment, and as a result of this as well as the natural wind and air disturbances that occur, the accuracy of the spray application may be affected. This in turn may reduce the quality of the pest control that is obtained and also may contaminate non-target areas. In order to minimize these problems, it is known to use anti-drift shields with the spray equipment in order to more effectively restrict the spray application to a designated target area. While various shield configurations have been employed for particular uses, they are rather restricted in where they may be used in a satisfactory manner and are generally not adaptable to a wide variety of conditions such as very irregular topographies, vegetation height and spray nozzle patterns. Further, these various shield configurations tend not to accommodate full view of spray nozzle performance, while at the same time providing shroud protection from wind.

U.S. Pat. Nos. 3,977,605 and 4,186,879 each disclose mobile spray units utilizing a rigid spray housing or shield with there being provided at the lower end of the housing or shield a relatively small flexible shroud or baffle. In the '605 patent this flexible shroud, identified at 64, extends all the way around the shield, while in the '879 patent the flexible sections 54 and 60 are on the front and rear walls only.

U.S. Pat. No. 4,804,145 discloses a mobile compost spreader that utilizes a drape of flexible material that extends around the discharge side of the dispensing brush. Accordingly, this is a 3-sided drape against which the compost material impinges.

SUMMARY OF THE INVENTION

It is an object of the present invention to provide a mobile spray unit with an anti-drift shield which is simple and economic in construction, yet highly effective in protecting the spray from wind and air disturbances and in defining a predetermined spray pattern.

A further object of the invention is to provide such a shield which will accommodate substantial terrain irregularities and yet will function without damage to itself or to the vegetation.

A still further object is to provide a shield that is vertically adjustable relative to the spray nozzles to accommodate various nozzle spray angles and patterns and is laterally adjustable to accommodate spray booms of various lengths.

Another object is to provide visibility of spray nozzle performance to assist the operator in proper adjustment of the spray nozzles.

In accordance with the invention there is provided a frame which is part of the mobile spray unit. A horizontally disposed spray boom is supported from this frame and distributed along this boom are a number of spray nozzles oriented to direct their spray in a downward direction. The nozzles are fluidly connected with a suitable source of chemical. Positioned around this spray boom is the tubular frame of an anti-drift shield. The frame is of generally racetrack configuration having a central component and U-shaped end components. The frame is supported by the central component in a manner that permits it to be vertically adjustable with respect to the spray boom. The two end components through a telescoping support arrangement are laterally adjusted with respect to the central component so that the length of the frame can be varied to accommodate various lengths of spray boom. Supported by and extended down from the frame is a flexible fabric curtain which provides a complete lateral enclosure for the downward directed sprays from the spray nozzles. The curtain in the preferred embodiment is a flexible, transparent and chemically resistant plastic like PVC. The curtain comprises overlapping sheets of the PVC to accommodate rough terrain and obstacles and aids in simplifying adjustments of the perimeter of the curtain.

BRIEF DESCRIPTION OF THE DRAWINGS

FIG. 1 is a top view of a portion of the mobile spray unit of the invention showing the spray tank, spray boom and anti-drift curtain;

FIG. 2 is a rear view, in the nature of an elevation, but with a portion of the curtain being broken away; and FIG. 3 is in the nature of a top view of the anti-drift curtain frame with this view being somewhat schematic in order to show details of construction and showing the frame in exploded fashion; and FIG. 4 is a modification, by which adjustable stiffening bars are provided within the curtain.

DESCRIPTION OF THE PREFERRED EMBODIMENT

In accordance with the invention there is provided a frame member 24 which supports the chemical supply tank 45 with these elements forming part of the mobile spray unit which may take the form shown in my U.S. Pat. No. 4,725,004 issued Feb. 16, 1988, the disclosure of which is hereby incorporated by reference. Secured to the frame member 24 are the laterally spaced tubes 10 with these tubes 10 being secured to frame member 24 by the vertically spaced U-bolts 12 such that these rods may be vertically adjusted with respect to frame member 24. At the lower region of the rods 10 is mounted the horizontally extending spray boom 14 and positioned in spaced relation along this boom are the spray nozzles 16 with these nozzles being secured to and supported by boom 14 and oriented to direct their spray in a downward direction. Boom 14 is secured to each of the rods 10 by means of U-bolts 18 which extend around the boom 14 and through the rods 10 (FIG. 2).

The nozzles 16 are supplied with chemical from tank 45 by means of the flexible conduits 20 which can accommodate vertical adjustment of the nozzles 16 and this vertical adjustment is obtained by means of vertically adjusting the rods 10 with respect to the frame 24 so that the position of the nozzles 16 with respect to the ground can be varied as desired for obtaining the optimum results with any particular nozzle spray pattern.

To protect the spray profiles from the nozzles 16 from wind and air disturbances as well as to reduce, if not eliminate, the drift of spray materials from the target area there is provided an anti-drift shield 21 that completely laterally surrounds the downwardly directed spray pattern distributed along the spray boom 14. The anti-drift shield 21 includes a frame 22 having a generally racetrack configuration in plan as shown in FIGS. 1 and 3 with this frame being of tubular construction and having a central component or section 26 and end sections 28. The central section 26 is made up of parallel spaced tubes 30 that are held in fixed relation to each other by means of spaced support transverse assemblies 33 as best shown in FIG. 3. Each of these assemblies includes a pair of risers 29 welded to and extending downwardly from the tubes and at their lower extremities are welded to a cross bar 32. These U-shaped assemblies, being rigidly connected with the tubes 30, integrate the central section 26 into a unitary structure. Centrally connected with the cross bar 32 and extending upwardly therefrom is the support riser 34 with this riser being effective to support the antidrift frame 22 from spray boom 14. For this purpose, brackets 36 (FIG. 2) are provided, with these brackets being fixedly secured to the rods 10 by means of U-bolt 18 and with the risers 34 in turn being adjustably fastened to the brackets 36 by means of U-bolts 38 so that the vertical position of the frame 22 with respect to the spray boom 14 and accordingly spray nozzle 16 can be adjusted. The U-shaped support assemblies 33 permit the frame 22 to be adjusted through a range, the extremities of which are well above and below the spray boom 14.

The end portions 28 of the tubular frame are supported by and laterally adjustable with respect to the central section 26 by means of a telescoping construction. The end positions 28 are fabricated of a tubular material that has a diameter sufficiently smaller than the internal diameter of tubes 30 so that they will slide into these tubes. The telescoping tubular sections are secured together at such positions by suitable fastening devices cooperating with the aligned opening, such as pins or cap screws. With this arrangement the lateral dimension are frame 22 may be substantially varied and adjusted as desired to accommodate spray booms 14 of different length.

Depending from the frame 22 and hanging from the frame to the ground all the way around the frame is the curtain 42 of a flexible material. Since the entire curtain is a flexible material extending from the frame to the ground with the frame generally being positioned close to the spray nozzles the curtain is of substantial vertical dimension and accordingly has a large amount of flexibility so that extremely rough terrain may be accommodated and the use of the shield will not result in vegetation or crop damage. In the preferred embodiment, the curtain 42 is made of overlapping sheets 43. The sheets 43 are 16 inches in length by 8 inches in width and overlap by one half of one inch. The curtain 42 is supported from the tubular frame 22 in any desired manner as, for example, rings that are received in grommeted openings at the upper end of the curtain 42 or the curtain 42 could be looped over the frame 22 and stitched. When laterally adjusting the shield by means of telescopingly supported end members 28 in order to accommodate a spray boom 14 of different length, the lateral dimension of the flexible curtain 42 will be varied accordingly by adding or subtracting from the same.

Figure 4:
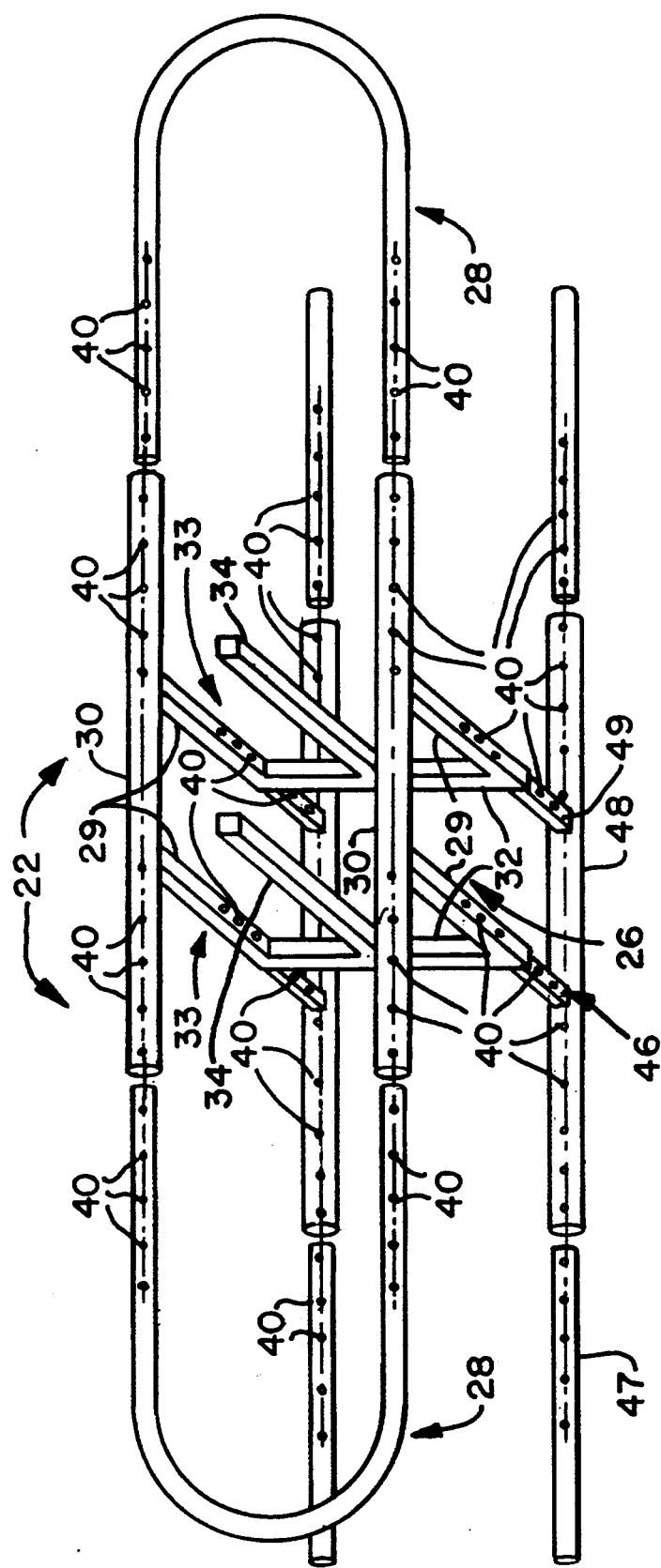

FIG. 4 shows a modification, by which a backup assembly 46 modifies the flexibility of the curtain by vertically adjusting a pair of longitudinally oriented bars, rods or tubes, situated in parallel, spaced apart relation immediately inside the curtain. Each one of a pair of these internal backup assemblies 46 has a mid-section 48 and two outer sections 47 which telescope with the mid-section. A pair of posts 49 rigidly extend vertically upward from the mid-section 48, in telescoping relation with a corresponding pair of risers 29 from the support assembly 33. As described with respect to other adjustable aspects of the present invention, a plurality of spaced apart through holes 40 are provided on members 47 and 48, so that any selected telescopic relationship can be fixed for use, and likewise between the posts 49 and risers 29, to select and fix any desired vertical relationship between the assemblies 46 and the frame 22.

It should be appreciated that when the backup assembly 46 is secured to the support assembly 33, the horizontal bars 47, 48 will limit the inward movement of the curtain 42, i.e., in a direction transverse to the peripheral frame. This can be desirable to prevent the curtain segments from making contact with the spray pattern when the wind velocity exceeds, e.g., 18–20 miles per hour. An important aspect of this feature of the invention, is that the user can optimize between high flexibility of the curtain for riding over plants and the like, versus limiting the flexibility to prevent excessive "flapping" of the curtain segments toward the spray pattern. The ideal settings for the elevation of the assembly 46, will be determined empirically, taking into account the material of the curtain, the type of plants or vegetation to be sprayed, the spray pattern, and the wind conditions. With the assembly 46 in the highest elevation position, it has virtually no restricting influence on the flexibility of the curtain, whereas in the lowermost position of greatest stiffening, the bars would extend downwardly to at least the vertical mid point of the curtain.

Accordingly, with the invention there is provided a mobile spray unit with an anti-drift shield 21 which is of simple and economic construction and yet is both vertically and laterally adjustable to accommodate a variety of conditions including, terrain irregularities, vegetation height, wind conditions, and nozzle spray patterns.

I claim:

1. A mobile spray unit for connection to a frame member on a motive assembly to move the unit over ground to be sprayed, comprising:

a pair of horizontally spaced vertical support members connectable to said frame member in a manner such that the supports can be vertically adjusted relative to the frame member;

a horizontally extending spray boom secured to and supported by said vertical support members;

a plurality of spray nozzles distributed along said boom and oriented to direct their spray downwardly;

flexible conduit means adapted to convey fluid to said nozzles;

shroud means providing a flexible curtain laterally surrounding the spray from the nozzles to confine the spray within the enclosure provided by the curtain, said shroud means including a horizontally disposed peripheral tubular frame having a central section and laterally adjustable U-shaped end sections, the central section including a pair of horizontal, coplanar, laterally spaced parallel tubular members rigidly interconnected by a pair of transverse assemblies extending below the spray boom, each of said transverse assemblies having secured thereto a vertically extending member positioned adjacent a different one of the vertical support members, means interconnecting these adjacent members, including a bracket fastened to the vertical support member and connected to the adjacent vertically extending member in a manner permitting vertical adjustment thereof, thereby providing for vertical adjustment of the peripheral frame relative to the spray nozzles, the end sections of the peripheral frame being interconnected with the central section permitting lateral adjustment therebetween, means securing these sections in their laterally adjusted positions, and a flexible curtain supported by and hanging down from said peripheral frame throughout the extent of said frame to thereby laterally enclose the spray from the spray nozzles.

2. The apparatus of claim 1 wherein the end sections of the tubular frame are slidingly received within the tubular members of the central section.

3. The apparatus of claim 1 wherein each of the transverse members interconnecting the parallel tubular members is of U-shaped construction extending down from said tubular members and said vertically extending member is secured to the base of this U-shaped construction generally centrally thereof.

4. The apparatus of claim 1 wherein the curtain comprises a plurality of flexible overlapping elements.

5. The apparatus of claim 4, wherein the curtain comprises a plurality of overlapping sheets of transparent plastic material.

6. The apparatus of claim 4, wherein each of the overlapping elements is connected to the peripheral frame so as to be slidable longitudinally along said peripheral frame.

7. The apparatus of claim 5, wherein the elements are each about 16 inches in length.

8. The apparatus of claim 1, further including means carried by the transverse assemblies, for limiting the movement of said curtain, transversely to the peripheral frame.

9. The apparatus of claim 8, wherein said means for limiting, include a pair of parallel, spaced apart rod members, each situated within the curtain, and means extending vertically from the rod members, for connection to the transverse assemblies.

10. The apparatus of claim 9, wherein each of the transverse assemblies interconnecting the parallel tubular members is of U-shaped construction extending down from said tubular members, and said vertically extending member is secured to the base of this U-shaped construction generally centrally thereof, and said means extending vertically from the rod members, adjustably engages the leg portions of said transverse assemblies.

* * * * *